(12) United States Patent
Nishida et al.

(10) Patent No.: US 9,389,464 B2
(45) Date of Patent: Jul. 12, 2016

(54) LIQUID CRYSTAL DISPLAY DEVICE

(71) Applicant: NLT Technologies, Ltd., Kanagawa (JP)

(72) Inventors: Shinichi Nishida, Kanagawa (JP); Naoyuki Taguchi, Kanagawa (JP); Takahiko Watanabe, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 140 days.

(21) Appl. No.: 13/826,388

(22) Filed: Mar. 14, 2013

(65) Prior Publication Data

US 2013/0242222 A1 Sep. 19, 2013

(30) Foreign Application Priority Data

Mar. 14, 2012 (JP) .................................. 2012-058037

(51) Int. Cl.
*G02F 1/1343* (2006.01)
*G02F 1/1362* (2006.01)
*G02F 1/1337* (2006.01)

(52) U.S. Cl.
CPC .... *G02F 1/133753* (2013.01); *G02F 1/134363* (2013.01); *G02F 1/136213* (2013.01)

(58) Field of Classification Search
CPC ................ G02F 1/134363; G02F 1/136213
See application file for complete search history.

(56) References Cited

U.S. PATENT DOCUMENTS

| | | | | |
|---|---|---|---|---|
| 6,292,237 B1* | 9/2001 | Hebiguchi | ........ | G02F 1/136213 349/141 |
| 2004/0114082 A1* | 6/2004 | Lee | ................................ | 349/141 |
| 2008/0036930 A1* | 2/2008 | Konno et al. | .................... | 349/33 |
| 2010/0079695 A1* | 4/2010 | Um et al. | ........................ | 349/43 |
| 2010/0149468 A1* | 6/2010 | Ina et al. | ....................... | 349/114 |

FOREIGN PATENT DOCUMENTS

| | | |
|---|---|---|
| JP | 2002-122876 | 4/2002 |
| JP | 2004-062145 | 2/2004 |
| JP | 2004-212436 | 7/2004 |

\* cited by examiner

*Primary Examiner* — Jessica M Merlin
(74) *Attorney, Agent, or Firm* — Young & Thompson (57) ABSTRACT

A transverse electric field-type liquid crystal display device displays by rotating homogeneous-aligned liquid crystals by a transverse electric field substantially parallel to a substrate, applied across a pixel electrode and a common electrode, assuring sufficient storage capacitance while enlarging the area of driving the liquid crystal molecules in a sub pixel. A source pixel electrode connected to a source electrode extends along the data line, a storage capacitance electrode formed by the same layer as the data line is formed above an adjacent scan line so as to overlap the adjacent scan line, the source pixel electrode is disposed so as to be connected to the storage capacitance electrode and a pixel along one side, an interlayer film is formed over the source pixel electrode, and a pixel electrode and a common electrode formed by a transparent conductive film are formed over the interlayer film.

4 Claims, 9 Drawing Sheets

(Related Art)

LIQUID CRYSTAL DISPLAY DEVICE

TECHNICAL FIELD

The present invention relates to a liquid crystal display device and, more particularly, to an active-matrix-type liquid crystal display device in which liquid crystal molecules are driven with an electric field substantially perpendicular to a thin film transistor substrate.

BACKGROUND ART

A liquid crystal display device of a TN (Twisted Nematic) type being widely used has high contrast but, on the other hand, has a problem of high visual angle dependence since the molecular axis of the liquid crystal rises due to the vertical electric field. Since demand for a large-sized monitor of a TV or the like is increasing in recent years, a so-called transverse-electric-field-type liquid crystal panel such as the IPS (In-Plane Switching) type or FFS type is being spread, in which an electric field substantially parallel to a substrate for which thin film transistors (hereinafter, called TFTs) are provided is applied to liquid crystal molecules to drive the molecules. A transverse-electric-field-type liquid crystal display panel of, for example, the IPS type has a plurality of pixel electrodes substantially parallel to a data line or scan line on a substrate, and a common electrode which is paired with the pixel electrodes. By an electric field substantially parallel to the substrate formed between the pixel electrodes and the common electrode, the liquid crystal molecules are turned in a plane parallel to the substrate, thereby controlling display. By driving the liquid crystal molecules in this manner, the visual angle dependency with respect to the rise angle of the molecular axis is eliminated. The visual angle characteristic is more advantageous as compared with that of the TN type.

Figure 10:
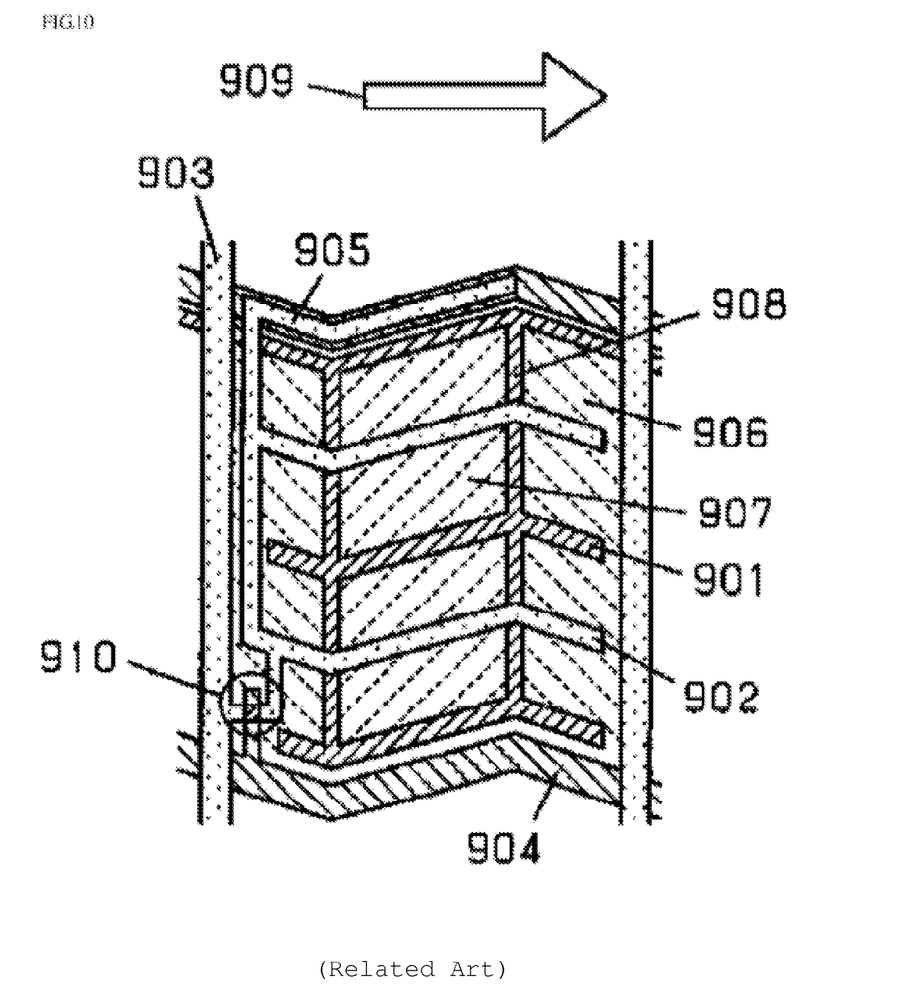
FIG. 10 is a plan view of a conventional liquid crystal display device.

In such a liquid crystal display device, it is preferable to drive liquid crystal molecules in a wider range. For example, patent literature 1 discloses a technique of driving a liquid crystal material in a wider area, provided as a layer between a substrate for which a TFT is provided and an opposed substrate which is opposed to the substrate and has a color filter. In the patent literature 1, for example, a technique of shortening the interval of neighboring pixel electrodes to be smaller than the limit determined by the conventional process margin and preventing short-circuit of the neighboring pixel electrodes. Patent literature 2 discloses a liquid crystal display device of a transverse electric field type with improved brightness by disposing a pixel electrode and an opposed electrode substantially parallel to a scan line, making a data line and a source pixel electrode adjacent to each other, and forming a storage capacitance electrode on the scan line (FIG. 10). On the other hand, patent literature 3 discloses s liquid crystal display device of the transverse electric field type with improved aperture ratio in which a scan line and a data line are covered with a common electrode via an interlayer insulating film.

Patent Literature 1: Japanese Unexamined Patent Application Publication No. 2004-212436
Patent Literature 2: Japanese Unexamined Patent Application Publication No. 2002-122876
Patent Literature 3: Japanese Unexamined Patent Application Publication No. 2004-062145

SUMMARY OF THE INVENTION

In the patent literature 1, to generate an electric field substantially parallel to a substrate, a pixel electrode and a common electrode have to be disposed on the substrate. For example, between a data line and the pixel electrode, a clearance has to be provided to prevent a delay in transmission of a data signal. The electrode has to be disposed apart from the data line for the clearance, the range of driving the liquid crystal molecules cannot be widened in the sub pixel, and it causes a problem that the aperture ratio cannot be increased.

In the patent literature 2, in a liquid crystal display device of a transverse electric field type, between a data line and a pixel electrode, a clearance has to be provided to prevent a delay in transmission of a data signal. For example, in the liquid crystal display device, the data line and the pixel electrode are in the same layer, so that the connecting part of the pixel electrode has to be disposed apart from the data line, and there is a problem such that the range of driving the liquid crystal molecules cannot be widened in the sub pixel.

On the other hand, in the patent literature 3, the storage capacitance is generated between the pixel electrode and the common electrode line and between the pixel electrode and the common electrode in the liquid crystal display device. Since the storage capacitance is generated on the short side of a pixel in structure, large area cannot be assured, and there is a problem such that sufficient storage capacitance cannot be assured.

The present invention has been made in consideration of the above circumstances and an object of the invention is to sufficiently assure storage capacitance while enlarging an area of driving liquid crystal molecules in a sub pixel.

To solve the problem, the present invention provides a liquid crystal display device of a transverse electric field type performing display by rotating horizontal-aligned liquid crystals by a transverse electric field which is applied across a pixel electrode and a common electrode and is substantially parallel to a substrate, including: a substrate having a plurality of data lines disposed in parallel and a plurality of scan lines disposed substantially perpendicular to the data lines and in parallel to one another, and having thin film transistors corresponding to respective sub pixels aligned in a matrix surrounded by the data lines and the scan lines and disposed around intersections between the data lines and the scan lines; an electric potential supply line extending along the data line in a sub pixel region and connected to a source electrode of the thin film transistor; and a storage capacitance electrode continued to the electric potential supply line, disposed above the scan line via an insulating layer, and generating capacitance between the scan line and itself. The pixel electrode has pixel electrode first parts and a pixel electrode second part, the pixel electrode first parts are disposed in a layer upper than the electric potential supply line in the sub pixel region and linearly formed in substantially parallel to the scan line, the pixel electrode second part is continued to the pixel electrode first parts, formed in parallel to the data line, and connected to the electric potential supply line, the common electrode has common electrode first parts and a common electrode second part, the common electrode first parts are aligned opposed to the pixel electrode first parts, apart from the pixel electrode first parts at same distance, and generate an electric field substantially parallel to the substrate, and the common electrode second part is continued to the common electrode first parts and provided above the storage capacitance electrode via an insulating film.

The present invention also provides a liquid crystal display device of a transverse electric field type performing display by rotating horizontal-aligned liquid crystals by a transverse electric field which is applied across a pixel electrode and a common electrode and is substantially parallel to a substrate, including: a substrate having a plurality of data lines disposed in parallel and a plurality of scan lines disposed substantially perpendicular to the data lines and in parallel to one another, and having thin film transistors corresponding to respective sub pixels aligned in a matrix surrounded by the data lines and the scan lines and disposed around intersections between the data lines and the scan lines; an electric potential supply line extending along the data line in a sub pixel region and connected to a source electrode of the thin film transistor; and a storage capacitance electrode continued to the electric potential supply line, disposed above the scan line via an insulating layer, and generating capacitance between the scan line and itself. The pixel electrode expands in a plane shape above the electric potential supply line within the sub pixel region and is connected to the electric potential supply line, the common electrode has common electrode first parts and a common electrode second part, the common electrode first parts are aligned facing the pixel electrode above the pixel electrode via an insulating layer and generate, between the pixel electrode and themselves, an electric field substantially parallel to the substrate, and the common electrode second part is continued to the common electrode first parts and provided above the storage capacitance electrode via an insulating film.

Further, the present invention provides a liquid crystal display device of a transverse electric field type performing display by rotating horizontal-aligned liquid crystals by a transverse electric field which is applied across a pixel electrode and a common electrode and is substantially parallel to a substrate, including: a substrate having a plurality of data lines disposed in parallel and a plurality of scan lines disposed substantially perpendicular to the data lines and in parallel to one another, and having thin film transistors corresponding to respective sub pixels aligned in a matrix surrounded by the data lines and the scan lines and disposed around intersections between the data lines and the scan lines; an electric potential supply line extending along the data line in the sub pixel region and connected to a source electrode of the thin film transistor; and a storage capacitance electrode continued to the electric potential supply line, disposed above the scan line via an insulating layer, and generating capacitance between the scan line and itself. The common electrode expands in a plane shape above the electric potential supply line in the sub pixel region and is connected to the electric potential supply line, the pixel electrode has pixel electrode first parts and a pixel electrode second part, the pixel electrode first parts are aligned facing the common electrode above the common electrode via the insulating layer and generate, between the common electrode and themselves, an electric field substantially parallel to the substrate, and the pixel electrode second part is continued to the pixel electrode first parts and provided above the electric potential supply line via an insulating film.

According to the present invention, when viewed from a direction perpendicular to the substrate, the pixel electrode or the common electrode can be disposed closer to the data line side, and while generating an electric field for driving liquid crystal molecules more widely in the sub pixel, the storage capacitance can be sufficiently assured.

DESCRIPTION OF PREFERRED EMBODIMENTS OF THE INVENTION

Embodiments of the present invention will be described.

First Embodiment

Figure 1:
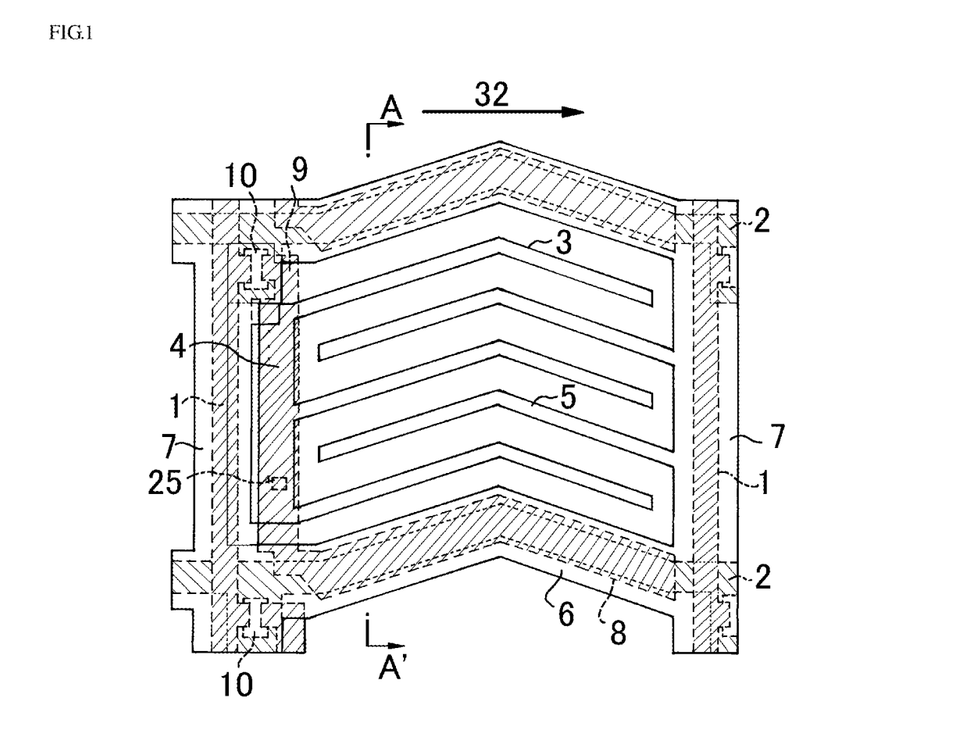
FIG. 1 is a plan view illustrating the configuration of one sub pixel in a liquid crystal display device as a first embodiment of the present invention.

As illustrated in FIG. 1, in a liquid crystal display device, a plurality of data lines 1 are disposed in parallel to one another on a transparent substrate (first substrate). A plurality of scan lines 2 are disposed substantially perpendicular to the data lines 1. By the plurality of data lines 1 and the scan lines 2, a plurality of sub pixel regions arranged in a matrix are defined.

A gate electrode is provided on the scan line 2 near a part crossing the data line 1, and the drain electrode is connected from the data line 1 crossing the scan line 2. With such a structure, a thin film transistor can be formed near the crossing part of the data line 1 and the scan line 2.

On one of the sides of the data line 1, a source pixel electrode (an electric potential supply line connected to the source electrode) is disposed along the data line 1, and the source electrode of the TFT is connected to the source pixel electrode Pixel electrodes are disposed in a layer upper than the source pixel electrode 9 and formed in a comb-teeth shape.

For example, the pixel electrode is constructed by a plurality of first parts 3 (first parts of a pixel electrode) substantially parallel to the scan lines, and a second part 4 (a second part of the pixel electrode) continued to the first parts 3.

In correspondence to the pixel electrode, a common electrode also has a plurality of first parts 5 (first parts of the common electrode) substantially parallel to the scan lines, and third and second parts 7 and 6 (third and second parts of a common electrode) continued to the first parts 5.

The first parts 5 of the common electrode and the first parts 3 of the pixel electrode are disposed at predetermined intervals and can generate an electric field substantially parallel to the substrate.

Figure 2:
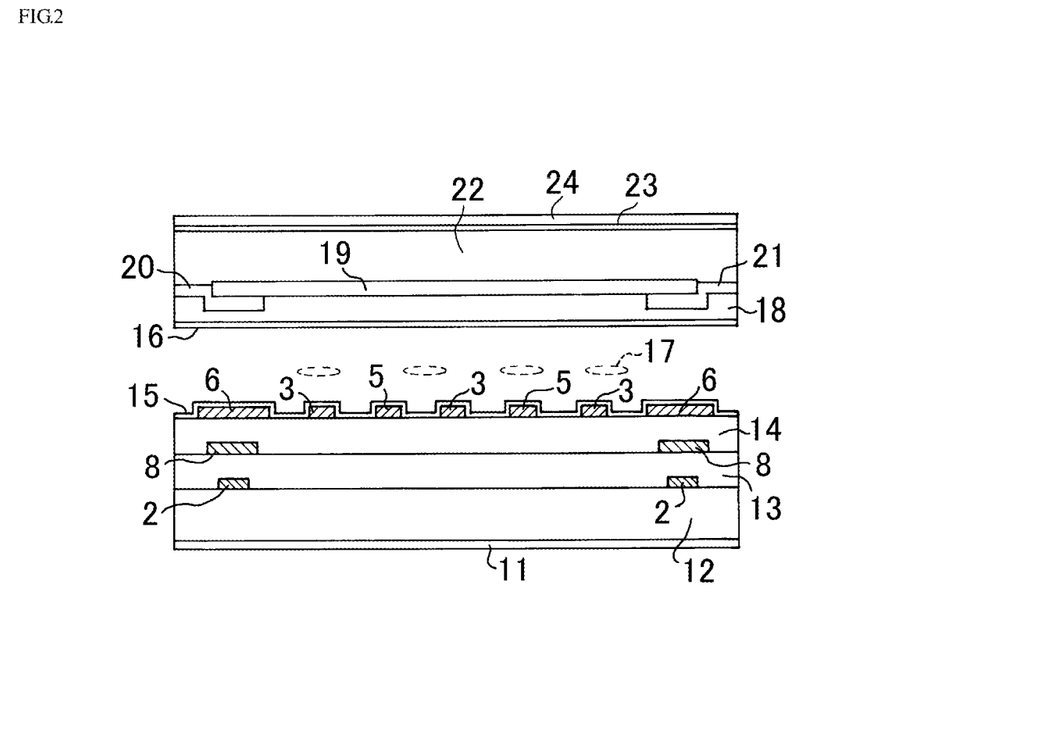
FIG. 2 is a cross section taken along line A-A' of FIG. 1, illustrating the liquid crystal display device as the first embodiment of the invention.

The pixel of the first embodiment illustrated in FIGS. 1 and 2 will be described in detail in fabricating order.

First, on a glass substrate as a first insulating substrate 12, the scan line 2 is formed by a first metal layer made by 2500 A of Cr.

As a gate insulating film 13, 5000 A of SiNx and a thin film semiconductor layer made of 2000 A of a-Si and 500 A of n-a-Si are formed. A thin film semiconductor layer 10 is patterned while leaving only a TFT part provided as a switching element of the pixel. By a second metal layer made by 2500 A of Cr, the data line 1, source/drain electrodes of the TFT, the source pixel electrode 9 connected to the source electrode of the TFT, and a storage capacitance electrode 8 are formed.

Using the source/drain electrodes of the TFT as a mask, n-a-Si in the TFT channel part is removed.

6000 A of SiNx is formed as a protection insulating film 14, and a through hole 25 for connecting the pixel electrode is formed.

On the protection insulating film 14, a pattern is formed by a transparent electrode made by 800 A of ITO, which is made of the first part 3 of the pixel electrode, the second part 4 connecting the first parts of the pixel electrodes, the first part 5 of the common electrode, the second part 6 of the common electrode which shields the data line, and the third part 7 of the common electrode which shields the data line. The pixel electrode made by ITO is connected to the source pixel electrode 9 formed by the second metal layer via the through hole 25 in the second part 4.

A TFT array is formed according to the above-described method.

Subsequently, a method of manufacturing a color filter substrate will be described. On the back face of a second transparent insulating substrate 22, 200 A of an ITO film 23 is formed. A black matrix 34 is formed on the surface and, after that, a pattern is formed in order of a green (G) layer 19, a red (R) layer 20, and a blue (B) layer 21. Further, an overcoat layer 18 is formed and, on the overcoat layer 18, a pillar spacer 35 is formed.

Alignment films 15 and 16 are formed on the surface of the array substrate and the surface of the color filter substrate fabricated as described above, and rubbing process is performed in the direction of 32. The substrates are adhered to each other, a liquid crystal material is injected in the space between the substrates, and the resultant is sealed. Liquid crystals 17 are aligned in the direction of an initial alignment 32 of the liquid crystals.

Further, on the outer sides of the glass substrates on both sides, polarizers 11 and 24 are adhered so that their polarization axes are orthogonal to each other. The direction of the absorption axis of the incident-side polarizer on the TFT array substrate side is matched with the direction of the initial alignment of the liquid crystals.

By providing the liquid crystal display panel fabricated as described above with a backlight and a drive circuit, an active matrix liquid crystal display device of the transverse electric field type of the first embodiment is completed.

The first part 3 of the pixel electrode and the first part 5 of the common electrode constructing the comb-shaped electrode, and the second part 6 of the common electrode shielding the scan line are formed substantially in parallel to one another and are bent in a center part of the pixel. The right half of the first part 3 of the pixel electrode tilts only by θ in the clockwise direction from the liquid crystal alignment direction, and the lower part of the left half tilts only by −θ.

Since the scan line 2 and the pixel electrodes 3 and the common electrodes 5 constructing the comb-shaped electrode extending in the extension direction of the scan line 2 are bent symmetrically with respect to the liquid crystal alignment direction, the electric field in the direction turned from the perpendicular direction (the extension direction of the data line) only by θ in the clockwise direction is applied on the right half side in the diagram of the pixel, and the electric field in the direction turned from the perpendicular direction only by θ in the counterclockwise direction is applied on the left half side in the diagram of the pixel.

By the electric fields, the liquid crystal molecules on the right and left sides of the pixel turn in the opposite directions. The liquid crystal molecules optically compensate with one another, so that a wide view angle characteristic without tone inversion and coloring can be obtained. In the embodiment, θ is set to 15°.

The source pixel electrode 9 made by the second metal layer which is the same as the data line 1 extends along the data line 1 and is connected to the storage capacitance electrode 8 made by the second metal layer formed on the scan lines 2 which are neighboring each other and serving as sides of the sub pixel.

The storage capacitance electrode 8 made by the second metal layer formed on the scan line 2 generates capacitance between the scan line 2 and itself and functions as a storage capacitor.

The storage capacitance electrode 8 is covered also with the second part 6 of the common electrode, so that storage capacitance is formed also between the storage capacitance electrode 8 and the second part 6 of the common electrode. With the configuration, larger storage capacitance can be formed in small area.

Preferably, the storage capacitance electrode 8 made by the second metal layer is wider than the scan line 2 and covers the scan line 2. In such a manner, the storage capacitance electrode 8 made by the second metal layer has the same potential as that of the pixel electrode 3, and the function of shielding the electric field from the scan line 2. Consequently, the second part 6 of the common electrode shielding the scan line 2 does not have to be so wide.

In the case where there is no storage capacitance electrode 6 made by the second metal layer, the common electrode 6 for shielding the electric field of the scan line 2 has to be projected from the edge of the scan line 2 by 7 μm. By covering the scan line 2 with the storage capacitance electrode 8 made by the second metal layer, the width of the projection can be reduced to 6 μm.

From the above description, it is understood that by applying the first invention of the application, high aperture ratio can be obtained in a sub pixel which is long in the scan line direction.

Figure 3:
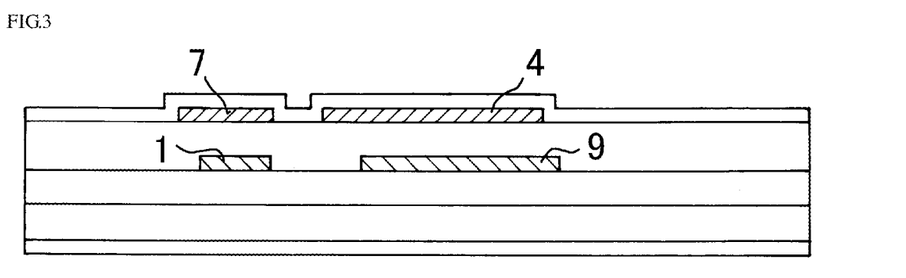
FIG. 3 is a cross section of a substrate, taken along a plane substantially perpendicular to the extension direction of the data line in the liquid crystal display device as the first embodiment of the invention.

By providing the pixel electrode above the source pixel electrode 9 as illustrated in FIG. 3, the pixel electrode can be disposed closer to the data line 1 side, and the electric field for driving the liquid crystal can be generated in a wider area.

By making the source pixel electrode 9 connected to the source electrode of the thin film transistor extend along the data line 1, the source pixel electrode 9 is formed in the short side of the sub pixel, and the length can be minimized, so that the area of the part can be also minimized. As a result, the aperture ratio can be improved.

By forming the source pixel electrode 9 and the storage capacitance electrode 8 in a substantially L shape, the aperture ratio can be increased.

In the pixel structure, the entire common electrode potential is generated by the ITO film in the uppermost layer. By forming the ITO in the uppermost layer in a matrix, it is connected to the common electrode potential in the periphery. In the sub pixel, there is no electrode connected to the common electrode potential in the other layers. Since an electrode which disturbs improvement in the aperture ratio does not have to be formed, the aperture ratio can be improved.

With such a configuration, without forming an extra electrode which disturbs improvement in the aperture ratio, sufficiently large storage capacitance can be formed in a small area, and the electric field from the scan line 2 and the data line 1 can be sufficiently shielded. Consequently, the excellent liquid crystal display with high aperture ratio and high transmissivity can be obtained.

Figure 4:
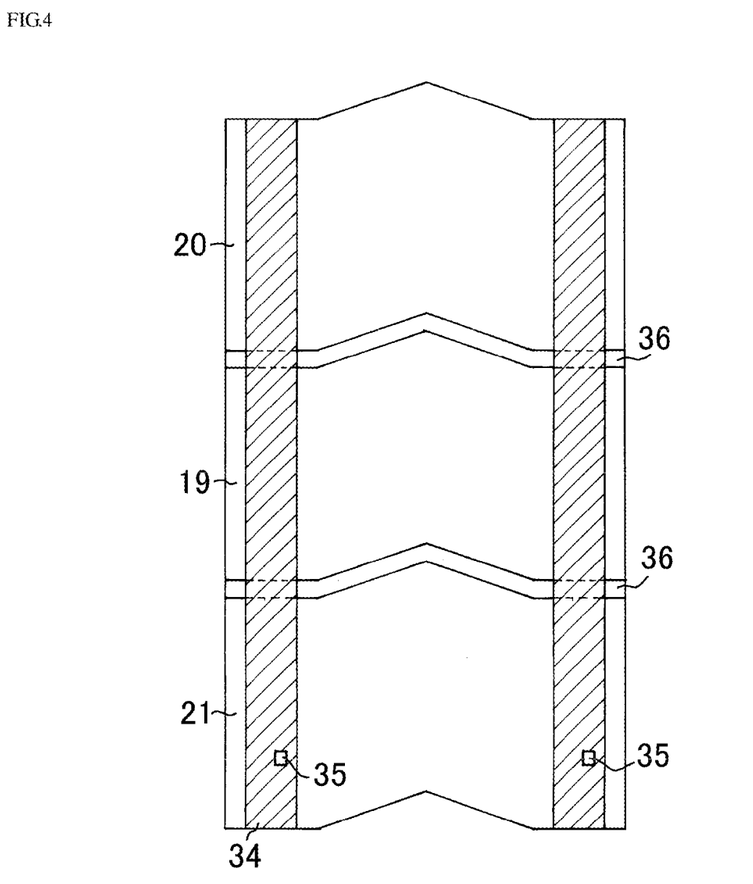
FIG. 4 is an explanatory diagram illustrating a mode of arranging three sub pixels of FIG. 1 in the liquid crystal display device as the first embodiment of the invention.

FIG. 4 illustrates an example of forming one pixel by arranging, along the extension direction of the data line, three sub pixels shown in FIG. 1. The three sub pixels correspond to the color layer 20 of R, the color layer 19 of G, and the color layer 21 of B. Like in the case of disposing the sub pixels of R, G, and B so that they are connected to the same data line, the pixel structure having sub pixels which are horizontally long has high aperture ratio. By connecting the sub pixels of R, G, and B to the same data line, the number of driver ICs for driving the data line can be decreased, and the liquid crystal display device can be fabricated at lower cost.

By disposing the black matrix 34 in the extension direction of the data line, the part near the data line 1 and opposed to the TFT is shielded. As a pattern in which the color layers of R, G and B extend in the extension direction of the scan line 2, at the border of the color layers, a color-overlap shield part 36 is disposed so that the color layers of about 6 μm overlap. Since the part above the scan line 2 is shielded with the storage capacitance electrode 8 made by the second metal layer and the third part 6 of the common electrode formed of ITO, the liquid crystal is not moved by the electric field from the scan line 2. Consequently, it is unnecessary to increase the light shield performance so much. By setting the width of the color-overlap shield part 36 to 6 μm, mixture of colors between the color layers can be prevented and the light shield part does not extend to the opening part. Thus, high transmissivity can be maintained.

Second Embodiment

Figure 5:
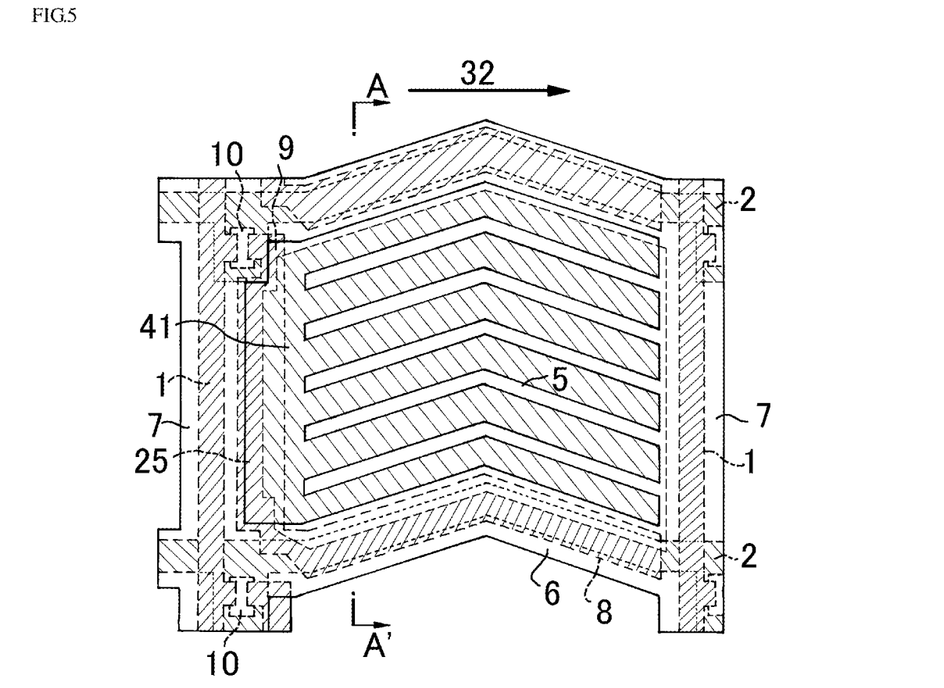
FIG. 5 is a plan view illustrating the configuration of one sub pixel in a liquid crystal display device as a second embodiment of the present invention.
Figure 6:
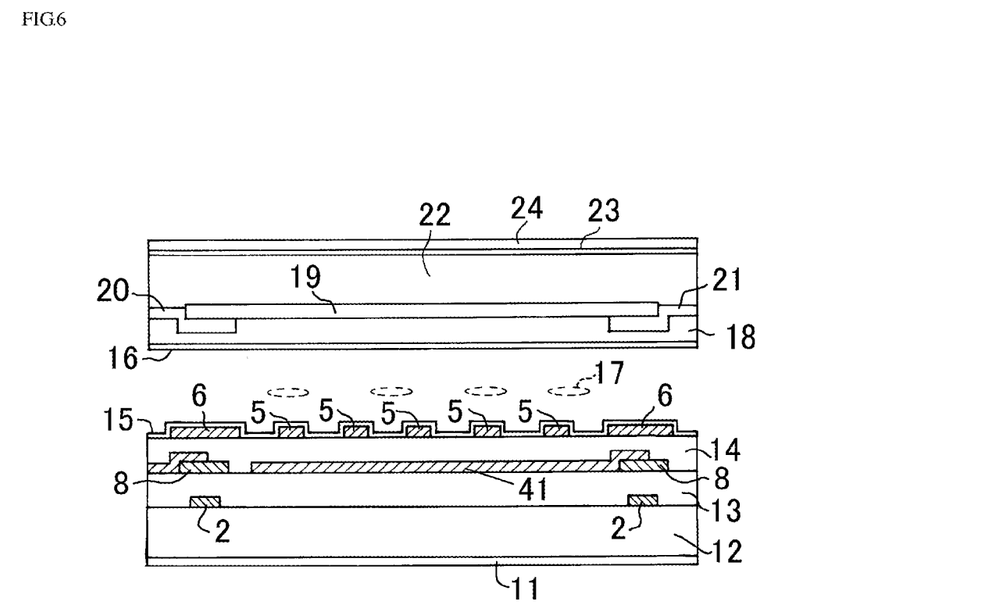
FIG. 6 is a cross section taken along line A-A' in FIG. 5 of the liquid crystal display device as the second embodiment of the present invention.

A second embodiment of the present invention will be described with reference to FIGS. 5 and 6. FIG. 5 is a plan view illustrating the configuration of one sub pixel in a liquid crystal display device as a second embodiment of the present invention. FIG. 6 is a cross section taken along line A-A' of FIG. 5.

The pixel of the second embodiment illustrated in FIGS. 5 and 6 will be described in detail in fabricating order.

First, on a glass substrate as the first insulating substrate 12, the scan line 2 is formed by a first metal layer made by 2500 A of Cr.

As the gate insulating film 13, 5000 A of SiNx and a thin film semiconductor layer made of 2000 A of a-Si and 500 A of n-a-Si are formed. The thin film semiconductor layer 10 is patterned while leaving only a TFT part provided as a switching element of the pixel. By a second metal layer made by 2500 A of Cr, the data line 1, source/drain electrodes of the TFT, the source pixel electrode 9 connected to the source electrode of the TFT, and the storage capacitance electrode 8 are formed.

Using the source/drain electrodes of the TFT as a mask, n-a-Si in the TFT channel part is removed.

Subsequently, a pixel electrode 41 having a plane shape is formed by 800 A of a transparent electrode made of ITO.

As the protection insulating film 14, 6000 A of SiNx is formed. The through hole 25 connecting the pixel electrode is formed.

On the protection insulating film 14, a pattern is formed by a transparent electrode made by 800 A of ITO, which is made of the first part 5 of the common electrode, the second part 6 of the common electrode shielding the scan line, and the third part 7 of the common electrode shielding the data line.

A TFT array is formed according to the above-described method.

Subsequently, a method of manufacturing a color filter substrate will be described. On the back face of the second transparent insulating substrate 22, 200 A of the ITO film 23 is formed. The black matrix 34 is formed on the surface and, after that, a pattern is formed in order of the green (G) layer 19, the red (R) layer 20, and the blue (B) layer 21. Further, the overcoat layer 18 is formed and, on the overcoat layer 18, the pillar spacer 35 is formed.

The alignment films 15 and 16 are formed on the surface of the array substrate and the surface of the color filter substrate fabricated as described above, and rubbing process is performed in the direction of 32. The substrates are adhered to each other, a liquid crystal material is injected in the space between the substrates, and the resultant is sealed. The liquid crystals 17 are aligned in the direction of the initial alignment 32 of the liquid crystals.

Further, on the outer sides of the glass substrates on both sides, the polarizers 11 and 24 are adhered. The direction of the absorption axis of the incident-side polarizer on the TFT array substrate side is matched with the direction of the initial alignment 32 of the liquid crystals.

By providing the liquid crystal display panel fabricated as described above with a backlight and a drive circuit, an active-matrix liquid crystal display device of the transverse electric field type of the second embodiment is completed.

The first part 5 of the common electrode and the second part 6 of the common electrode shielding the scan line are formed substantially in parallel to each other and are bent in a center part of the pixel. Since the scan lines 2 and the common electrodes 5 constructing the comb-shaped electrode extending in the extension direction of the scan line are bent symmetrically with respect to the liquid crystal alignment direction, across the pixel electrode 41 and the common electrodes 5, a fringe electric field in the direction turned from the perpendicular direction (the extension direction of the data line) only by θ in the clockwise direction is applied on the right half side in the diagram of the pixel, and the electric field in the direction turned from the perpendicular direction only by θ in the counterclockwise direction is applied on the left half side in the diagram of the pixel.

By the electric fields, the liquid crystal molecules on the right and left sides of the pixel turn in the opposite directions. The liquid crystal molecules optically compensate with one another, so that a wide view angle characteristic without tone inversion and coloring can be obtained. In the embodiment, θ is set to 8°.

The source pixel electrode 9 made by the second metal layer which is the same as the data line 1 extends along the data line 1 and is connected to the storage capacitance electrode 8 made by the second metal layer formed on the scan lines 2 which are neighboring each other and serving as sides of the sub pixel.

By making the source pixel electrode 9 connected to the source electrode of the thin film transistor extend along the data line 1, the source pixel electrode 9 is formed in the short side of the sub pixel, and the length can be reduced the most, so that the area of the part can be minimized. It can improve the aperture ratio.

The storage capacitance electrode 8 made by the second metal layer formed on the scan line 2 generates capacitance between the scan line 2 and itself and functions as a storage capacitor.

The storage capacitance electrode 8 is covered also with the second part 6 of the common electrode, so that storage capacitance is formed also between the storage capacitance electrode 8 and the third part 6 of the common electrode. With the configuration, larger storage capacitance can be formed in small area.

Preferably, the storage capacitance electrode 8 made by the second metal layer is wider than the scan line 2 and covers the scan line 2. In such a manner, the storage capacitance electrode 8 made by the second metal layer has the same potential as that of the pixel electrode 41, and the function of shielding the electric field from the scan line 2. Consequently, the second part 6 of the common electrode shielding the scan line 2 does not have to be so wide.

In the case where there is no storage capacitance electrode 8 made by the second metal layer, the common electrode 6 for shielding the electric field of the scan line 2 has to be projected from the edge of the scan line 2 by 7 µm. By covering the scan line 2 with the storage capacitance electrode 8 made by the second metal layer, the width of the projection can be reduced to 6 µm.

The third part 7 of the common electrode which shields the data line 1 is formed so as to shield the region between the data line 1 and the source pixel electrode 9 made by the second metal layer. Consequently, the liquid crystal is deformed by the electric field applied across the data line 1 and the pixel electrode 41, and a cross talk can be suppressed by light leakage from the deformed part.

The pillar spacer 35 is disposed in a position which is on the black matrix of the sub pixel of B and is in contact with a part near the source pixel electrode 9 on the array substrate. In such a manner, high aperture ratio can be maintained without exerting influence on the aperture.

As described above, by applying the second invention of the present application, high aperture ratio can be obtained in a sub pixel which is long in the scan line direction.

In the pixel structure, the entire common electrode potential is generated by the ITO film in the uppermost layer. By forming the ITO in the uppermost layer in a matrix, it is connected to the common electrode potential in the periphery. In the sub pixel, there is no electrode connected to the common electrode potential in the other layers. Since an electrode which disturbs improvement in the aperture ratio does not have to be formed, the aperture ratio can be improved.

With such a configuration, without forming an extra electrode which disturbs improvement in the aperture ratio, sufficiently large storage capacitance can be formed in a small area, and the electric field from the scan line 2 and the data line 1 can be sufficiently shielded. Consequently, the excellent liquid crystal display with high aperture ratio and high transmissivity can be obtained.

Third Embodiment

Figure 7:
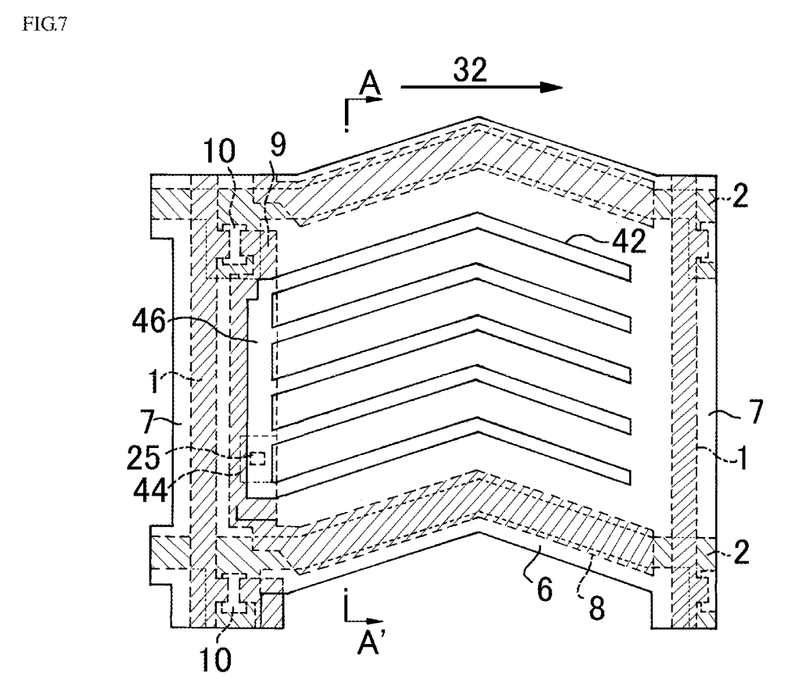
FIG. 7 is a plan view illustrating the configuration of one sub pixel in a liquid crystal display device as a third embodiment of the present invention.
Figure 8:
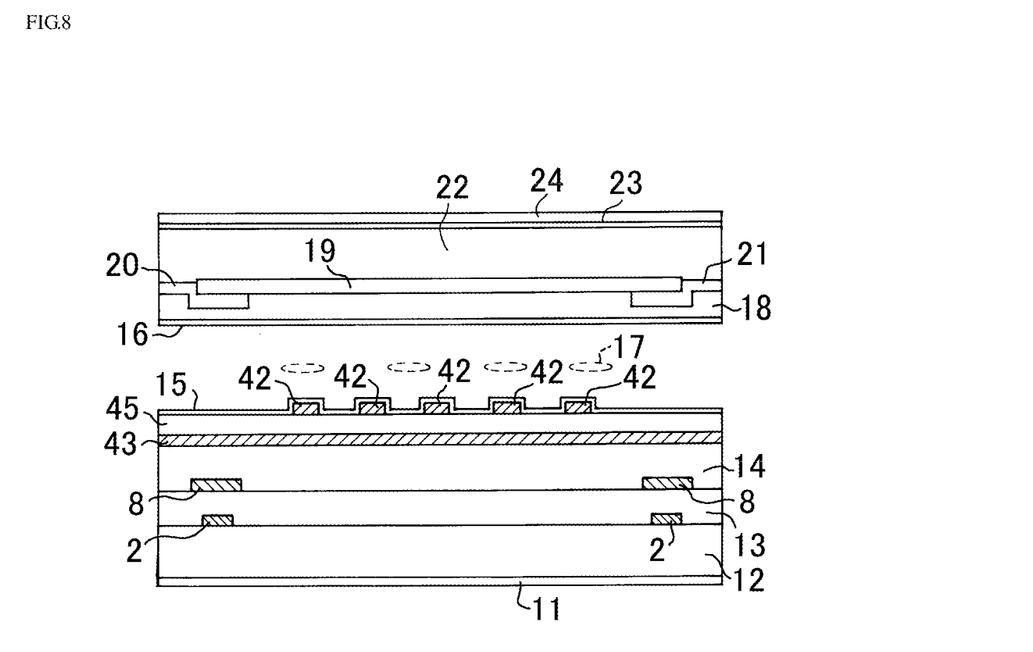
FIG. 8 is a cross section taken along line A-A' of FIG. 7, of the liquid crystal display device as the third embodiment of the present invention.
Figure 9:
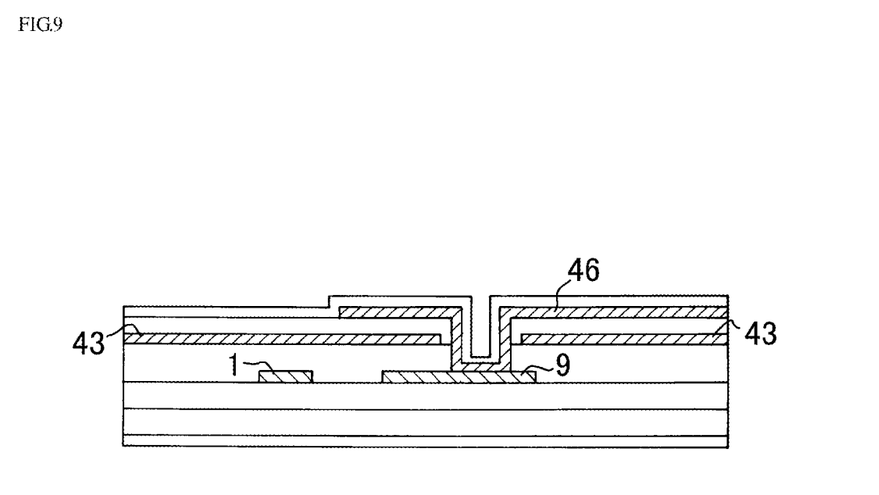
FIG. 9 is a cross section of a substrate, taken along plane perpendicular to the extension direction of a data line in the liquid crystal display device as the third embodiment of the present invention.

A third embodiment of the present invention will be described with reference to FIGS. 7, 8, and 9. FIG. 7 is a plan view illustrating the configuration of one sub pixel in a liquid crystal display device as a third embodiment of the present invention. FIG. 8 is a cross section of a TFT substrate, taken along line A-A' in FIG. 7.

The pixel of the second embodiment illustrated in FIGS. 7 to 9 will be described in detail in fabricating order.

First, on a glass substrate as the first insulating substrate 12, the scan line 2 is formed by a first metal layer made by 2500 A of Cr.

As the gate insulating film 13, 5000 A of SiNx and a thin film semiconductor layer made of 2000 A of a-Si and 500 A of n-a-Si are formed. The thin film semiconductor layer 10 is patterned while leaving only a TFT part provided as a switching element of the pixel. By a second metal layer made by 2500 A of Cr, the data line 1, source/drain electrodes of the TFT, the source pixel electrode 9 connected to the source electrode of the TFT, and the storage capacitance electrode 8 are formed.

Using the source/drain electrodes of the TFT as a mask, n-a-Si in the TFT channel part is removed.

As the protection insulating film 14, 6000 A of SiNx is formed.

On the protection insulating film 14, a plane-shaped common electrode 43 is formed by a transparent electrode made of 800 A of ITO. In the plane-shaped common electrode 43, a through hole 44 for connecting a pixel electrode is formed.

As a second protection insulating film 45, 3000 A of SiNx is formed.

The through hole 25 is formed in the gate insulating film 13, the protection insulating film 14, and the second protection insulating film 45.

Further, on the resultant, a pattern made of a plurality of stripe-shaped pixel electrodes 42 and the second part 46 of the pixel electrode coupling the pixel electrodes 42 is formed by a transparent electrode made of 800 A of ITO. The pattern is connected to the source pixel electrode 9 via the through holes 25 and 44 in the second part 46 of the pixel electrode.

A TFT array is formed according to above-described method.

A method of manufacturing a color filter substrate will be described (refer to FIG. 4). On the back face of the second transparent insulating substrate 22, 200 A of the ITO film 23 is formed. The black matrix 34 is formed on the surface and, after that, a pattern is formed in order of the green (G) layer 19, the red (R) layer 20, and the blue (B) layer 21. Further, the overcoat layer 18 is formed and, on the overcoat layer 18, the pillar spacer 35 is formed.

The alignment films 15 and 16 are formed on the surface of the array substrate and the surface of the color filter substrate fabricated as described above, and rubbing process is performed in the direction of 32. The substrates are adhered to each other, a liquid crystal material is injected in the space between the substrates, and the resultant is sealed. The liquid crystals 17 are aligned in the direction of the initial alignment 32 of the liquid crystals.

Further, the polarizers 11 and 24 are adhered on the outer sides of the glass substrates on both sides so that polarization axes are orthogonal to each other. The direction of the absorption axis of the incident-side polarizer on the TFT array substrate side is matched with the direction of the initial alignment 32 of the liquid crystals.

By providing the liquid crystal display panel fabricated as described above with a backlight and a drive circuit, an active-matrix liquid crystal display device of the transverse electric field type of the third embodiment is completed.

Since the scan lines 2 and the stripe-shaped pixel electrodes 42 extending in the extension direction of the scan lines 2 are bent symmetrically with respect to the liquid crystal alignment direction, across the stripe-shaped pixel electrodes 42 and the plane-shaped common electrode 43, a fringe electric field in the direction turned from the perpendicular direction (the extension direction of the data line) only by θ in the clockwise direction is applied on the right half side in the diagram of the pixel, and the electric field in the direction turned from the perpendicular direction only by θ in the counterclockwise direction is applied on the left half side in the diagram of the pixel.

By the electric fields, the liquid crystal molecules on the right and left sides of the pixel turn in the opposite directions. The liquid crystal molecules optically compensate with one another, so that a wide view angle characteristic without tone inversion and coloring can be obtained. In the embodiment, θ is set to 8°.

The source pixel electrode 9 made by the second metal layer which is the same as the data line 1 extends along the data line 1 and is connected to the storage capacitance electrode 8 made by the second metal layer formed on the scan lines 2 which are neighboring each other and serving as sides of the sub pixel.

By making the source pixel electrode 9 connected to the source electrode of the thin film transistor extend along the data line 1, the source pixel electrode 9 is formed in the short side of the sub pixel, and the length can be reduced the most, so that the area of the part can be minimized. It can improve the aperture ratio.

The storage capacitance electrode 8 made by the second metal layer formed on the scan line 2 generates capacitance between the scan line 2 and itself and functions as a storage capacitor.

The storage capacitance electrode 8 is covered also with the common electrode 43, so that storage capacitance is formed also between the storage capacitance electrode 8 and the common electrode 43. With the configuration, larger storage capacitance can be formed in small area.

Preferably, the storage capacitance electrode 8 made by the second metal layer is wider than the scan line 2 and covers the scan line 2. In such a manner, the storage capacitance electrode 8 made by the second metal layer has the same potential as that of the pixel electrode 41, and the function of shielding the electric field from the scan line 2.

As described above, by applying the third invention of the present application, high aperture ratio can be obtained in a sub pixel which is long in the scan line direction.

In the pixel structure, the common electrode potential is generated by the ITO layer as a component of the plane-shaped common electrode 43. By forming the common electrode in a matrix, it is connected to the common electrode potential in the periphery. In the sub pixel, there is no electrode connected to the common electrode potential in the other layers. Since an electrode which disturbs improvement in the aperture ratio does not have to be formed, the aperture ratio can be improved.

With such a configuration, without forming an extra electrode which disturbs improvement in the aperture ratio, sufficiently large storage capacitance can be formed in a small area.

The present invention can be used for an active-matrix liquid crystal display device of a transverse electric field type and arbitrary equipment using the liquid crystal display device as a display device.

What is claimed is:

1. A liquid crystal display device of a transverse electric field type performing display by rotating horizontal-aligned liquid crystals by a transverse electric field which is applied across a pixel electrode and a common electrode and is substantially parallel to a substrate, comprising:
    a substrate having a plurality of data lines disposed in parallel and a plurality of scan lines disposed substantially perpendicular to the data lines and in parallel to one another, and having thin film transistors corresponding to respective sub pixels aligned in a matrix surrounded by the data lines and the scan lines and disposed around intersections between the data lines and the scan lines, each of the sub pixels having a short side and a long side;
    an electric potential supply line extending along each of the data lines and connected to a source electrode of a corresponding thin film transistor in a sub pixel region, the electric potential supply line being formed in the short side of the sub pixel; and
    at least one storage capacitance electrode continued to the electric potential supply line, the at least one storage capacitance electrode being disposed above each of the respective scan lines via an insulating layer, and generating capacitance between the scan line and itself,
    wherein the pixel electrode has pixel electrode first parts and a pixel electrode second part,
    the pixel electrode first parts are disposed in a layer higher than the electric potential supply line in the sub pixel region and linearly formed in substantially parallel to each of the scan lines,
    the pixel electrode second part is continued to the pixel electrode first parts, formed in parallel to each of the data lines, and connected to the electric potential supply line,
    the common electrode has common electrode first parts and a common electrode second part,
    the common electrode first parts are aligned opposed to the pixel electrode first parts, apart from the pixel electrode first parts at same distance, and generate an electric field substantially parallel to the substrate,
    the common electrode second part is continued to the common electrode first parts and provided above the storage capacitance electrode via an insulating film, and
    wherein the electric potential supply line and the at least one storage capacitance electrode are continued and formed in a substantially L shape having a vertex near an intersection of each of the data lines and each of the scan lines.

2. The liquid crystal display device according to claim 1, wherein the common electrode second part covers the at least one storage capacitance electrode and generates capacitance between the at least one storage capacitance electrode and itself.

3. The liquid crystal display device according to claim 1, wherein an interval of the plurality of data lines is set to be larger than an interval of the plurality of scan lines.

4. The liquid crystal display device according to claim 1, wherein the at least one storage capacitance electrode is wider than each of the scan lines and substantially covers the entire area of each of the scan lines except in the vicinity of the data lines in the sub pixel region.

* * * * *